July 21, 1953 — O. C. TRAUTMAN — 2,646,490
CORE FOR IMMERSION HEATERS
Filed July 25, 1951
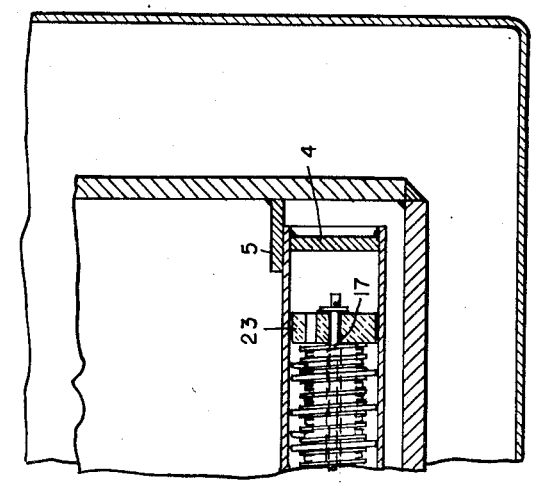
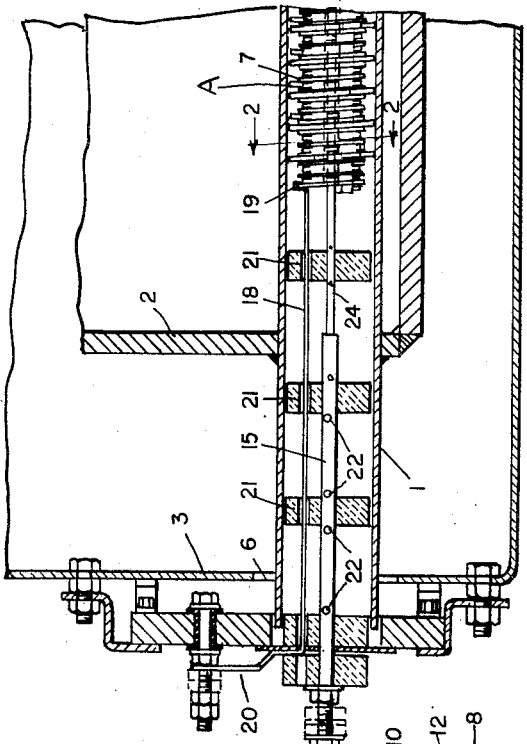
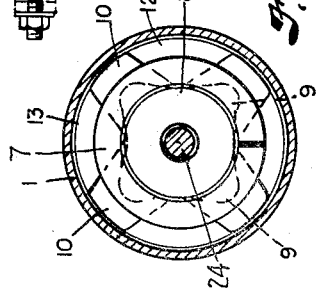
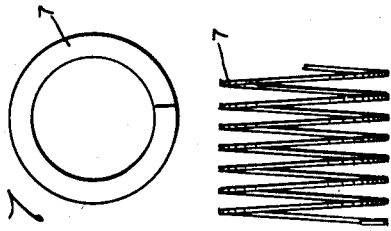
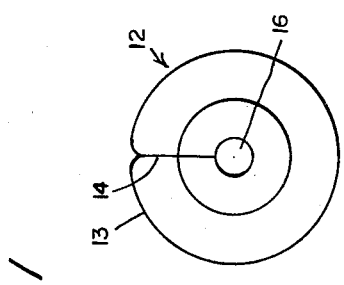
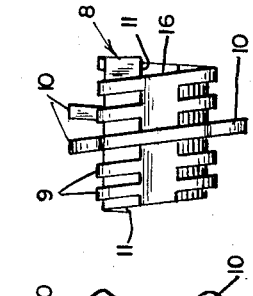
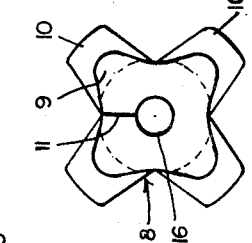
INVENTOR.
OSCAR C. TRAUTMAN
BY
Oberlin & Limbach
ATTORNEYS.

Patented July 21, 1953

2,646,490

UNITED STATES PATENT OFFICE 2,646,490

CORE FOR IMMERSION HEATERS

Oscar C. Trautman, Parma, Ohio, assignor to The Trauwood Engineering Company, Cleveland, Ohio, a corporation of Ohio Application July 25, 1951, Serial No. 238,440

7 Claims. (Cl. 201—67)

This invention relates to immersion heaters of the type employing a heating element of metal which is of high electrical resistance. More particularly, said invention relates to a core for a spiral or helical heating element and constitutes an improvement over the invention described in Patent No. 2,287,402, issued June 23, 1942, to W. H. Wood and myself.

Conventionally, such a heating element is inserted in a tube which is immersed in the material to be heated. Such heaters have proven useful in the heating of lead baths and the like in metallurgical processes. When so used, such a heater may comprise a tube mounted in the bottom of a vessel in which metal is to be heated and a metal heating element inserted in such tube. Conveniently, the metal heating element may be of wire in the form of a helix with an electrically non-conductive core inserted within the wire helix to support and insulate the latter.

One object of this invention is to provide a core which is electrically non-conductive and which may be readily inserted in a helix of wire, wherein it will separate and insulate the individual turns of the helix and support the latter out of contact with the walls of the tube in which the helix is installed.

A further object is to provide such a core formed of separate elements permitting the wire helix and core to conform to the arc of a curved tube used as the casing for such a heater.

Still another object is to provide a core including two types of separate elements, one type having a spiral thread thereon and the other type being provided with a plurality of helically disposed fins. Such fins have the advantage of leaving a major portion of a wire helix exposed for radiation of heat while the spiral thread affords close centering and support of the wire within a tube by contact therewith.

Other objects and advantages of the present invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a cross-sectional view of a heating pot, showing my invention partially in elevation inserted in the tube of an immersion heater installed for heating metal in such pot;

Fig. 2 is a cross-sectional view taken along the line 2—2 of Fig. 1;

Figs. 3 and 4 are end and side elevational views respectively of one type of core element used in my invention;

Figs. 5 and 6 are end and side elevational views respectively of the other type of core element which I employ; and Figs. 7 and 8 are end and side elevations respectively of the wire helix.

Referring to the drawing and more particularly to Fig. 1 thereof, there is shown in cross-section an immersion tube 1 mounted across a melting pot 2 by being welded for example in a hole in the side thereof. The pot 2 is mounted in a casing 3, the space between the walls of the pot and casing being packed with insulating material for conservation of heat in the melting pot. The inner side of tube 1 is closed by a metal plug 4 welded or otherwise secured therein, and is held in position in pot 2 by a stop 5 welded on the wall of pot 2. The outer end of tube 1 of the immersion heater projects through an opening 6 in the wall of casing 3, and conventional means are mounted thereabout on said wall for the insulated provision of electrodes from a source supplying a heating current of electricity.

A spiral of wire 7 of high electrical resistance constitutes the heating element of the heater and is supported within tube 1 by means of a core of refractory material generally indicated by A which is composed of separate short lengths or sections of a cylinder to permit the core and helix to conform to a curved tube which might be used as the casing for the heater. In actual practice, where the heater is immersed in a lead bath for example, the buoyant effect of such bath upon the heater is effective to cause the portion of the heater within the melting pot to arch or curve upwardly and therefore the provision of a core capable of conforming to a tube thus curved has been found desirable.

The individual lengths constituting the core A include parts 8 (see Figs. 3 and 4), each of which constitutes a section of a cylinder and is formed with radially projecting fins 9 on its outer arcuate surface. Said fins are disposed in circumferentially spaced helical arrangement thereabout, thereby simulating broken parts of a screw thread about such core section to facilitate insertion thereof into the wire helix and to separate the individual turns or convolutions of such helix. Some of the fins, four in number in the illustration, are somewhat longer than the others as indicated at 10, these being adapted to project beyond the outside circumference of the wire helix to engage the inner wall of tube 1 and thereby support and predeterminately locate the helix within tube 1 out of contact with the inner wall thereof. The ends of said core parts 8 are of helical form as shown, terminating in sharp transverse planes 11 whereby adjacent core parts may be accurately axially located one to another.

The other type of core part which I employ is illustrated in Figs. 5 and 6 of the drawing. Each of said parts designated 12 likewise constitutes a section of a cylinder. Said parts 12 differ from parts 8 in that instead of being provided with a plurality of fins, the same are each formed with a continuous radially projecting helical rib 13 which is in effect a screw thread to facilitate insertion thereof within the wire helix and to separate adjacent turns of such helix. Rib 13 is of a diameter substantially equal to the distance across diagonally opposite fins 10 of core part 8 and likewise adapted to contact the inner wall of tube 1 to locate the helix within such tube and out of contact with the inner wall thereof. The ends of core parts 12 are helical as shown and terminate in sharp transverse planes 14, as do parts 8.

Thus fins 10 and rib 13 together serve to support and locate the wire helix within tube 1. Preferably, the core parts 8 and 12 will be arranged alternately as shown in Fig. 1. I employ both types of core parts to make up the core A. Employment of only the circular type part 12, for example, would serve to unduly insulate and shield the individual turns of the wire helix thereby reducing the radiation of heat therefrom with a corresponding reduction in efficiency of the heater. On the other hand, if only core parts 8 were employed, then it would be necessary to rely upon fins 10 alone to support the helix within tube 1, which fins are not as well suited to the job as the spiral rib 13 formed on core parts 12.

In mounting the core A in the wire helix, the core parts 8 and 12 are inserted alternately thereinto with a screwing motion with the fins and rib of the respective core parts separating the individual turns of the helix. Such core parts are thus inserted until the helix is filled. A metal rod 15 is inserted through the axial passage 16 of such core parts 8 and 12 and welded to the inner end of the helix at 17, and a metal strap 18 is welded to the outer end of the helix at 19, the outer free end 20 of said strap being bent at an angle for engagement with an electrode. To the free ends of rod 15 and strap 18, outside tube 1, electrodes are attached in a conventional manner. For the further conservation of heat, refractory plugs 21 are placed in tube 1 when the helix and core are assembled therewithin. Rod 15 and strap 18 pass through holes provided in plugs 21 which plugs are held in position by pins 22 through rod 15. A plug 23 may be inserted in tube 1 before installing the helix and core to protect the closed welded end of tube 1 from contact with the welded joint 17 of the helix and rod. Since, as pointed out above, the tube is often arched upwardly by the buoyancy of the lead bath, it is desirable that rod 15 be of reduced cross-section within the melting pot, as indicated at 24, whereby to offer less resistance to such curving or arching.

Thus, I have secured my objective by forming a core of refractory material fitted within the helix of the heating element, which core is provided with a plurality of fins for separating the individual adjacent turns of the helix and further formed with continuous ribs likewise separating the turns of the helix, such ribs projecting beyond such fins to support the helix in predetermined position within a tube. Such fins leave exposed a major portion of the wire helix while the spiral ribs closely locate and support the helix by contact with the inner wall of the tube. Certain of the fins may likewise project beyond the other fins to assist in supporting the helix within the tube. The core is divided into a plurality of longitudinal sections so as to permit the same to conform to the arc of a curved tube.

The core parts 8 and 12 are preferably formed of ceramic material and burnt, the cost of a core so formed of individual sections being much less than the cost of a similar core formed integrally of the same material.

Other modes of applying the principle of the invention may be employed, change being made as regards the details described, provided the features stated in any of the following claims or the equivalent of such be employed.

I therefore particularly point out and distinctly claim as my invention:

1. A refractory core for a helical resistance element comprising a number of individual parts, arranged in end-to-end relationship, said parts including one or more pieces each constituting a section of a cylinder having helical ends and radially projecting fins on its outer arcuate surface disposed in circumferentially spaced, helical arrangement thereabout, whereby to separate the convolutions of such resistance element, said parts also including one or more pieces each constituting a section of said cylinder having helical ends adapted to radially abut the helical ends of said first-mentioned pieces and being provided with a continuous, radially projecting helical rib thereon extending radially beyond said fins, whereby to support said core in a predetermined position within an enclosing member and also to separate the convolutions of such resistance element.

2. A refractory core for a helical resistance element comprising a number of individual parts, arranged in end-to-end relationship, said parts including one or more alike integral pieces each constituting a section of a cylinder having helical ends and radially projecting fins on its outer arcuate surface disposed in circumferentially spaced, helical arrangement thereabout, whereby to separate the convolutions of such resistance element, said parts also including one or more alike pieces each constituting a section of said cylinder having helical ends adapted to radially abut the helical ends of said first-mentioned pieces and being provided with a continuous, radially projecting helical rib thereon extending radially beyond said fins, whereby to support said core in a predetermined position within an enclosing member and also to separate the convolutions of such resistance element.

3. A refractory core for a helical resistance element comprising a number of individual parts, arranged in end-to-end relationship, said parts including one or more pieces each constituting a section of a cylinder having helical ends and radially projecting fins on its outer arcuate surface disposed in circumferentially spaced, helical arrangement thereabout, whereby to separate the convolutions of such resistance element, said parts also including one or more pieces each constituting a section of said cylinder having helical ends adapted to radially abut the helical ends of said first-mentioned pieces and being provided with a continuous, radially projecting helical rib of uniform diameter thereon extending radially beyond said fins, whereby to support said core in a predetermined position within an enclosure member and also to separate the convolutions of such resistance element.

4. A refractory core for a helical resistance element comprising a number of individual parts, arranged in end-to-end relationship, said parts including one or more pieces each constituting a section of a cylinder having helical ends and radially projecting fins on its outer arcuate surface disposed in circumferentially spaced, helical arrangement thereabout, whereby to separate the convolutions of such resistance element, said parts also including one or more pieces each constituting a section of said cylinder having helical ends adapted to radially abut the helical ends of said first-mentioned pieces and being provided with a continuous, radially projecting helical rib thereon, said rib and some of said fins extending radially beyond the other fins, whereby to support said core in a predetermined position within an enclosing member and also to separate the convolutions of such resistance element.

5. A refractory core for a helical resistance element comprising a number of individual parts, arranged in end-to-end abutting relationship, said parts including one or more pieces each constituting a section of a cylinder and having radially projecting fins on its outer arcuate surface disposed in circumferentially spaced, helical arrangement thereabout, whereby to separate the convolutions of such resistance element, said parts also including one or more pieces each constituting a section of said cylinder and having a continuous, radially projecting helical rib thereon, said rib and some of said fins extending radially an equal distance beyond the other fins, whereby to support said core in a predetermined position within an enclosing member and also to separate the convolutions of such resistance element.

6. A refractory core for a helical resistance element comprising a number of individual pieces arranged in end-to-end abutting relationship, each alternate piece constituting a segment of a cylinder and having radially projecting fins on its outer arcuate surface disposed in helical arrangement thereabout, whereby to separate the convolutions of such resistance element, and each of the remaining pieces constituting a segment of said cylinder and having a continuous, radially projecting helical rib thereon extending radially beyond said fins, whereby to support said core in a predetermined position within an enclosing member and also to separate the convolutions of such resistance element.

7. A refractory core for a helical resistance element comprising a number of individual parts arranged in end-to-end abutting relationship, said parts including one or more alike integral pieces each constituting a section of a cylinder and having radially projecting fins on its outer arcuate surface disposed in circumferentially spaced helical arrangement thereabout, whereby to separate the convolutions of such resistance element, said parts also including one or more alike pieces each constituting a section of said cylinder and having a continuous, radially projecting helical rib of uniform major diameter thereon, said rib and some of said fins extending radially an equal distance beyond the other fins, whereby to support said core in a predetermined position within an enclosing member and also to separate the convolutions of such resistance element.

OSCAR C. TRAUTMAN.

References Cited in the file of this patent

UNITED STATES PATENTS

| Number | Name | Date |
|---|---|---|
| 2,287,402 | Wood et al. | June 23, 1942 |

FOREIGN PATENTS

| Number | Country | Date |
|---|---|---|
| 622,760 | Germany | Nov. 14, 1935 |